INVENTOR
GERHARD BOUCKE

INVENTOR
GERHARD BOUCKE
BY *Spencer & Kays*
ATTORNEYS

United States Patent Office 3,392,270
Patented July 9, 1968

3,392,270
INDICATOR
Gerhard Boucke, Ulm (Danube), Germany, assignor to Telefunken Patentverwertungsgesellschaft m.b.H., Ulm (Danube), Germany
Filed Sept. 14, 1964, Ser. No. 396,052
Claims priority, application Germany, Sept. 12, 1963, T 24,695
14 Claims. (Cl. 235—92)

ABSTRACT OF THE DISCLOSURE

An indicator for displaying in decimal form the result contained in a multidigit counter in which all of the indicator devices are connected with one of their groups of electrodes in parallel with one another and to a common decoding or code-converting matrix which is connected to the output side of the counting decimal places. The other group of electrodes in each indicator device is connected separately to the output of a signal source which delivers a cyclic clock pulse and which also controls the interrogation of the associated counting decimal place.

---

The present invention relates to an arrangement by means of which the result contained in a multidigit counter can be read off and indicated in decimal form. An indicator device is provided in known manner for each decimal place, each comprising two different groups of electrodes. Each of the indicator devices is connected to decoding or code-converting devices associated with the counting decimal places on the one hand, and to switching-over devices on the other hand.

In the known embodiments of such arrangements, it has proved a disadvantage that each counting decimal place has to be provided with its own decoding or code-converting device and also with a separate switching-over device so that the display of the counter result sometimes involved greater expenditure on circuitry than was necessary for the actual counting. This naturally had an adverse effect on the price of the equipment involved so that the decimal indication of the result of a count effected in binary mode, which indication is nowadays demanded or desired, led to a difference in price of approximately 50% between an apparatus with decimal indication and one with binary indication of the result.

With these defects of the prior art in mind, it is a main object of the present invention to reduce substantially the expenditure for the decimal indication of the result of counting effected in binary or any other desired code.

Another object of the invention is to provide such an arrangement which can easily be connected with recording devices with serial input.

These objects and others ancillary thereto are accomplished in accordance with preferred embodiments of the present invention wherein all the indicator devices are connected with one of their groups of electrodes in parallel with one another to a common decoding or code-converting matrix which in turn is connected to the output side of the counting decimal places. The other group of electrodes in each indicator device is connected separately to the output of a signal source which delivers a cyclic clock pulse and which also controls the interrogation of the associated counting decimal place. Switches are inserted in the connection between the electrodes of the indicator devices and the decoding or code-converting matrix, and pulse shapers are inserted in the connection between the electrodes of the indicator devices and the clock pulse source, or conversely pulse shapers are introduced into the first mentioned connections and switches into the second.

The pulse shapers, e.g., blocking oscillators, are intended to deliver the power for operating the indicator devices. If this is not convenient the pulse shapers may be substituted by switches and a common additional power source.

Additional objects and advantages of the present invention will become apparent upon consideration of the following description when taken in conjunction with the accompanying drawings in which.

Figure 1:
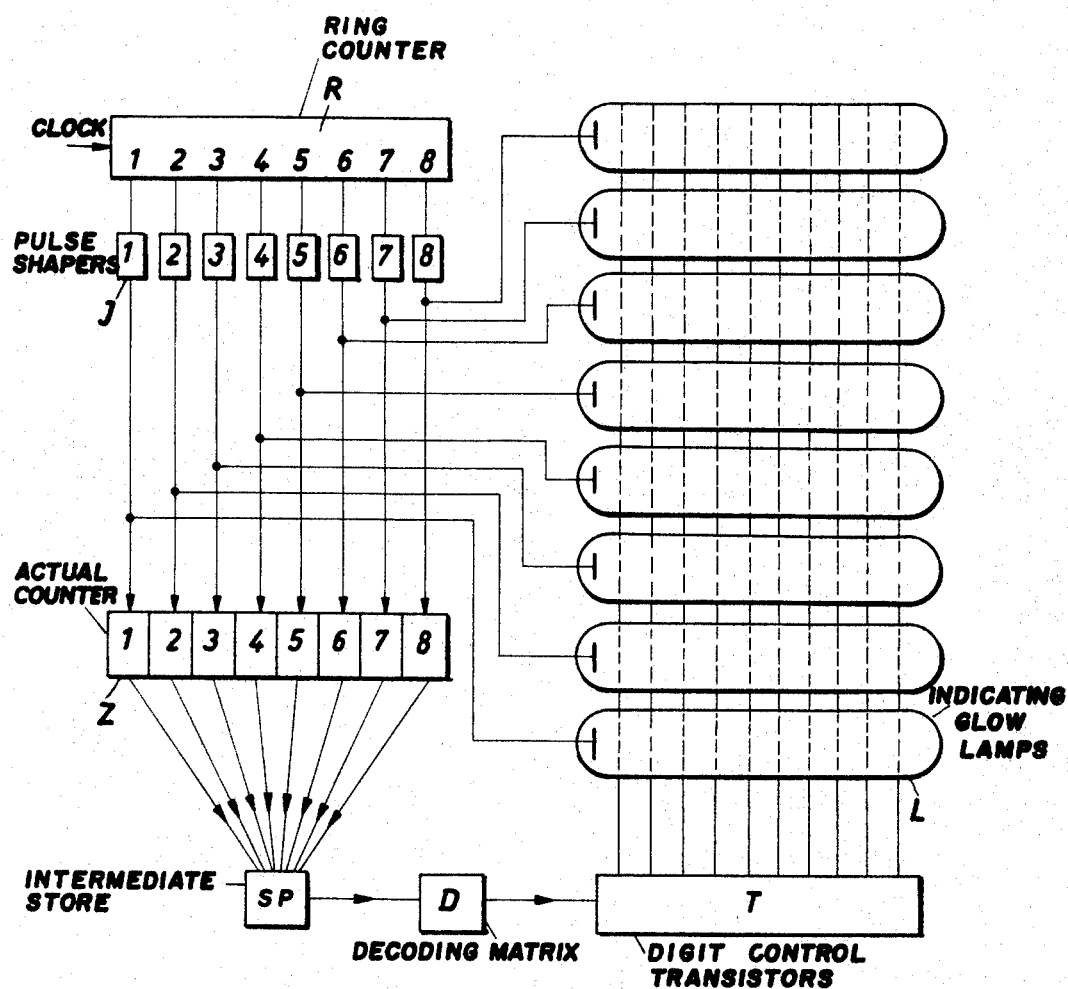
FIGURE 1 is a block diagram of an eight-digit binary-decimal indicator using glow lamps.

Before considering the drawings in detail, it should be noted that the arrangement according to the present invention operates on a clock pulse principle whereby the digit indicator panel associated with each counting decimal place lights up only for a short time, but with great intensity. The indicator panels situated side by side, which are needed for the representation of a multidigit number, light up in cyclic succession. The repetition frequency is selected so high that a still image is simulated to the eye.

In such an arrangement according to the invention, working as it does on the two-coordinate principle, there is the advantage not only of the saving in decoding and control elements, but also of the easy possibility of connecting it to recording devices with serial input, such as accounting machines, typewriters, or punched tape punches. Moreover, any desired number of counters can be read off with only one reading system according to the invention, without any substantial additional expenditure. For this, it is merely necessary to supply the interrogating pulses to the counters separately for each decimal place through gate circuits. The interrogation outputs of all the counters are connected in parallel with one another to the input of the decoding device. If it is desired to interrogate the contents of the counters in sequence, as is necessary, for example, when printing, the gate circuits may be controlled through a ring counter which only opens the gates for one counter at a time and, after this has been interrogated, steps on to the next counter.

In a further development of the arrangement according to the invention, it is an advantage to introduce an intermediate store between the outputs of the counting decimal places on the one hand and the input of the common decoding or code-converting matrix on the other hand, which intermediate store is so dimensioned that it can receive the contents of one counting decimal place. In conjunction with such an intermediate store, it is then possible to use switches for the switching devices which, like transistors, for example, require a specific control power during the whole time they are switched on, without this power having to be supplied by the counting decimal places themselves, so that it is possible to manage with a single high-power decimal place, namely that of the intermediate store.

A ring counter, the number of stages in which corresponds to that of the counting decimal places, may conveniently be provided as a clock pulse source for the control of the reading operation. These stages then merely contain one information which is different from that in all the other stages and which is shifted cyclically through all the other stages. Such a ring counter does not necessarily have to be an independent structural element and it is perfectly possible to design as a ring counter a part of the time divider which is in any case necessary for the actual electronic counter to be used as a frequency meter.

A counter which is associated with a decoding device wherein only one of the outputs, corresponding in number to that of the counting decimal places, delivers a signal at a time, may also be used as a clock pulse source, however. In this case, such a decoding device may be connected at the output side of part of the counter to be read off.

Instead of a separate ring counter, it is also possible to connect in the form of a ring the pulse shapers situated in the connections between the electrodes of the indicator devices and the inputs of the counting decimal places. The control signal for the following pulse shaper, for example a blocking oscillator, is then derived from the pulse edge at the end of a pulse. In this case, care must be taken to ensure that in such a ring circuit only a single pulse shaper can be energized at a time even after switching on, so as to prevent simultaneous emission of a pulse by more than one pulse shaper. This ring need not only be closed through the actual pulse shapers and it may be joined through an external clock pulse source, which then determines the sequence of interrogating pulses. Such an external clock pulse source may, for example, be the 50 or 60 c.p.s. A.C. mains which then in turn supplies the trigger pulses for each cycle.

It may be an advantage to introduce an auxiliary store, for example, bistable stages or even simple storage capacitors between each two pulse shapers and to provide an auxiliary pulse source which determines the time between the response of two adjacent pulse shapers. Such auxiliary stores afford the possibility of delaying the stepping on from one pulse shaper to the next, as a result of which, on the one hand, there is the possibility of bringing the intermediate store connected to the counter outputs to a definite initial state, for example the zero state between the end of an indication of the contents of one counting decimal place and the beginning of reading off the following decimal place. As a result of this, there can be a saving in expenditure on control, and, on the other hand, the clock pulse frequency, which is determined by the duration of the clock pulses delivered by the pulse shapers, can be reduced to a lower value necessary for the operation of a following printing device. This can be achieved simply by appropriate selection of the magnitude of the delay time by means of which the storage time in the auxiliary stores is determined by means of an appropriate adjustment of the associated control generator, which may be a monostable multivibrator, for example.

In order to achieve a clear result indication, it may be an advantage to connect a gate circuit with a preceding bistable stage to the output side of the decoding or code-converting matrix, which gate circuit only allows the first digital value differing from zero to reach the indicator devices. This prevents a counter content of 20 in an eight-digit counter, for example, from being represented by 00000020 in the indicating devices. The unnecessary zeros are kept away from the indicator devices by the gate circuit which is only opened by the bistable element when the first significant digit different from zero appears at the output of the decoding matrix. Once this gate has been opened, however, further zeros which may appear within a number can not close it again. At the beginning of a fresh cycle, on the other hand, the gate remains closed until the first digit differing from zero again appears at the output from the decoding matrix.

With more particular reference to the drawings, FIGURE 1 illustrates the reading of an eight-digit binary-decimal counter. Apart from the actual counter Z, the arrangement comprises a ring counter R, a set of pulse shapers J, an intermediate store SP, a decoding matrix D, digit control transistors T, and indicating glow lamps L. The ring counter R has as many places as the main counter Z has decimal places. One decimal place of the main counter Z is allocated to one place in the ring counter R. One place in the ring counter may contain the information 1, all the others 0. A clock pulse shifts the "1" cyclically through the right counter. The information 1 at one place in the ring counter causes the associated pulse shaper J to deliver a pulse. This pulse acts as an interrogating pulse for the associated decimal place of the main counter Z on the one hand, and causes the ignition of the associated digit indicator tube L on the other hand. The interrogation pulse reproduces the contents of the counter decimal place in the intermediate store SP. The decimal digit corresponding to the contents of the intermediate store SP is selected via the decoding matrix D and one of the ten digit selecting transistors T.

This selection control reaches the selected decimal digit in all the indicator tubes L. Actually, however, the digit is only indicated in the tube associated with the correct decimal place because the ignition pulse from the pulse shapers J is absent for all the others. Since, if there are eight decimal places, only ⅛ of the total time is available for the indication of one decimal place, eight times the normal constant power is supplied to the indicator tube during the brief period of illuminations.

If the reading is effected optically with the aid of the indicating glow lamps L, then a still image is desirable for the observer. For this purpose, the cycle frequency must amount to at least 30 secs. For reading by means of recording devices, the reading operation can be adapted to the speed of the electro-mechanical recording devices by changing over to a lower clock pulse frequency which may be controlled by the recording device itself in certain circumstances. The circuit elements may be so dimensioned that the recording device and the indicator tubes can be controlled through the same ten switches T.

Figure 2:
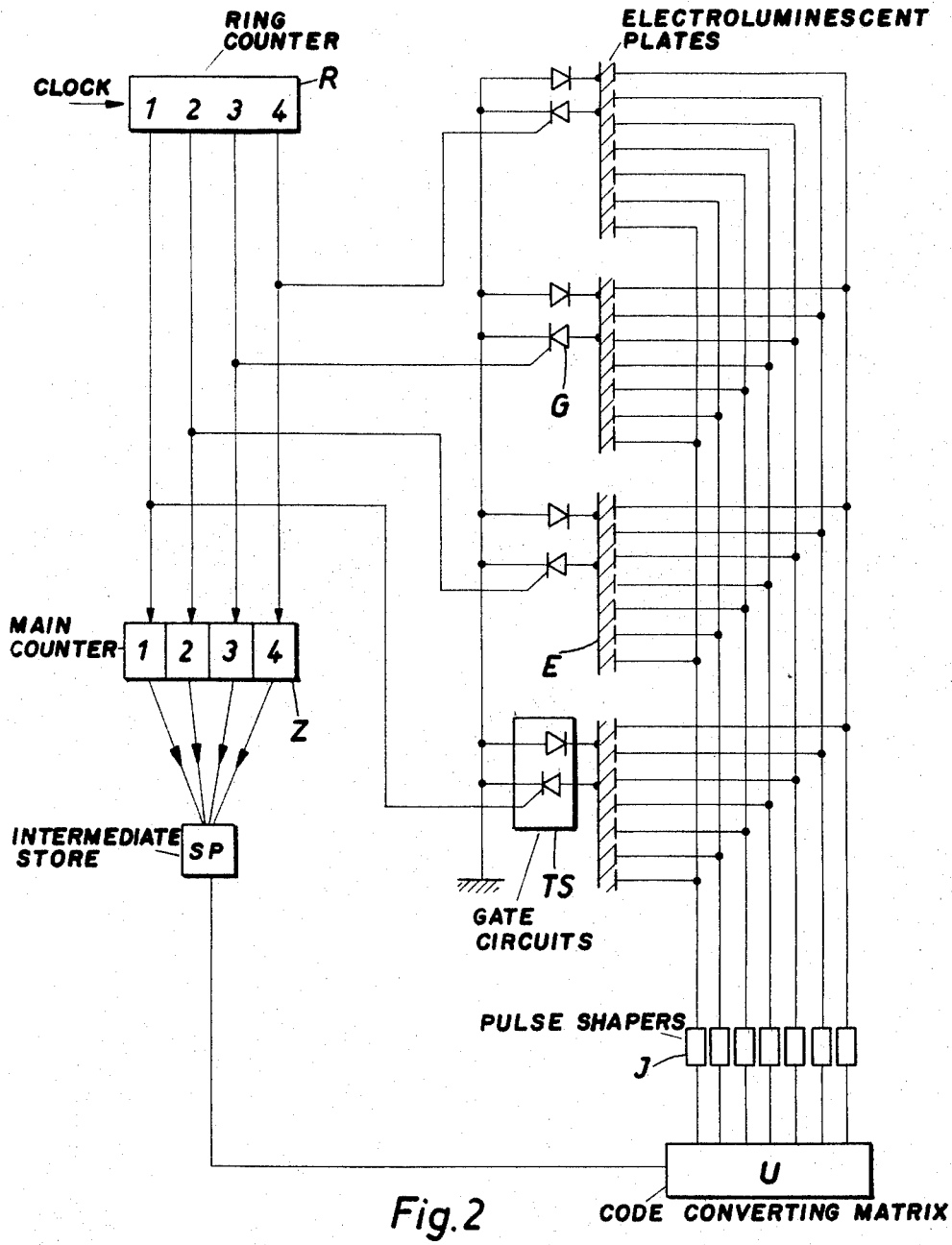
FIGURE 2 is a block diagram of a four stage binary-decimal indicator using electroluminescent devices.

FIGURE 2 illustrates the reading of a four-stage binary-decimal counter. Apart from the actual counter Z, the arrangement contains a ring counter R, an intermediate store SP, a code-converting matrix U, four gate circuits TS, seven pulse shapers J, and four electroluminescence plates E. The number of pulse shapers J depends on the number of digital elements from which the decimal digits are formed (minimum 7). The decade to be read is determined by the state of the ring counter R. The ring counter R delivers a reading pulse to the corresponding decimal place of the counter Z and at the same time an opening pulse to the gate circuit TS of the associated indicator plate E. The gates TS are constructed in the form of controllable rectifiers G in the example. The reading pulse causes the counter contents to be reproduced in the intermediate store SP. Its contents control, through the code-converting matrix U, the pulse shapers J associated with the digit elements of the indicator plates E. Blocking oscillators are preferred as pulse shapers J because these circuits are well suited to produce bipolar pulses of high amplitude. Photodiodes or photoresistors may be used in the gate circuits TS instead of the controlled rectifiers G, and the ring counter may be built up from thyratrons. The light emanating from the particular thyratron which is conducting is then used to control the light-sensitive gates.

Figure 3:
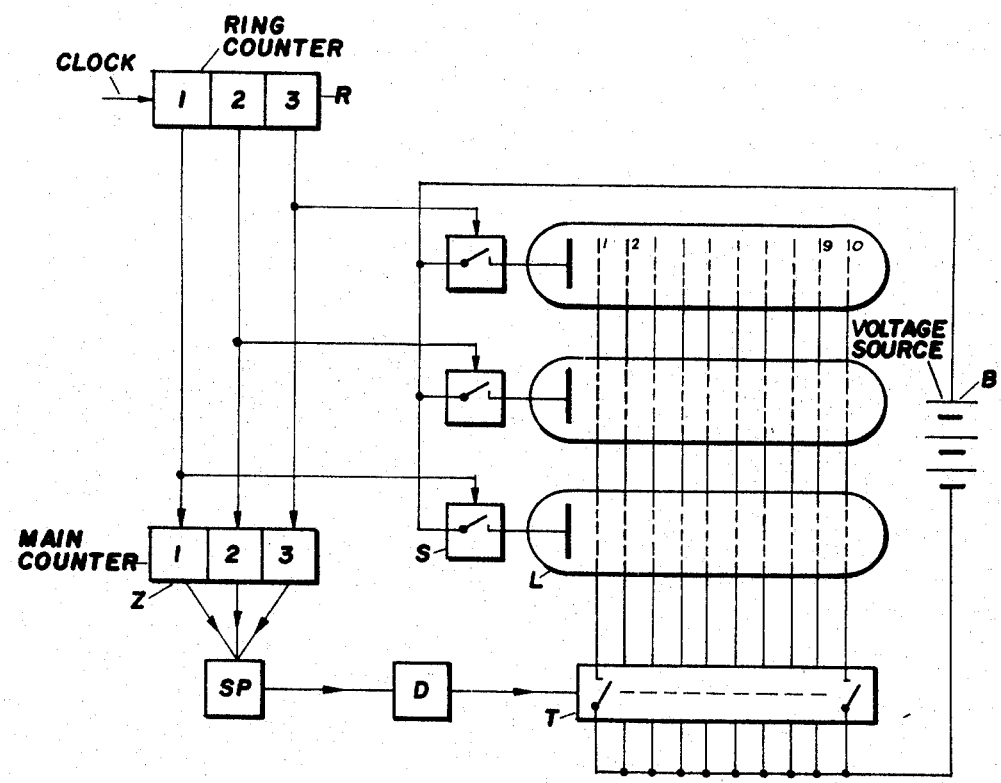
FIGURE 3 is a block diagram equivalent to that of FIGURE 1 with the exception that two groups of switches are used instead of switches and pulse shapers.

FIGURE 3 is in general equivalent to FIGURE 1 with the difference that the pulse shapers are replaced by switches S and an additional voltage source B. To each decade in the main counter Z belongs a switch S, a digit indicator tube L and a place in the ring counter R. In the ring counter a "1" is cyclically shifted. When it reaches the place of a certain main counter decade it gives an interrogating pulse to this decade and actuates the corresponding switch S. The interrogating pulse effects the decoding of the decade contents as said under FIGURE 1. The closed switch connects the voltage source B with the anode of the indicator tube, thus firing this tube.

Figure 4:
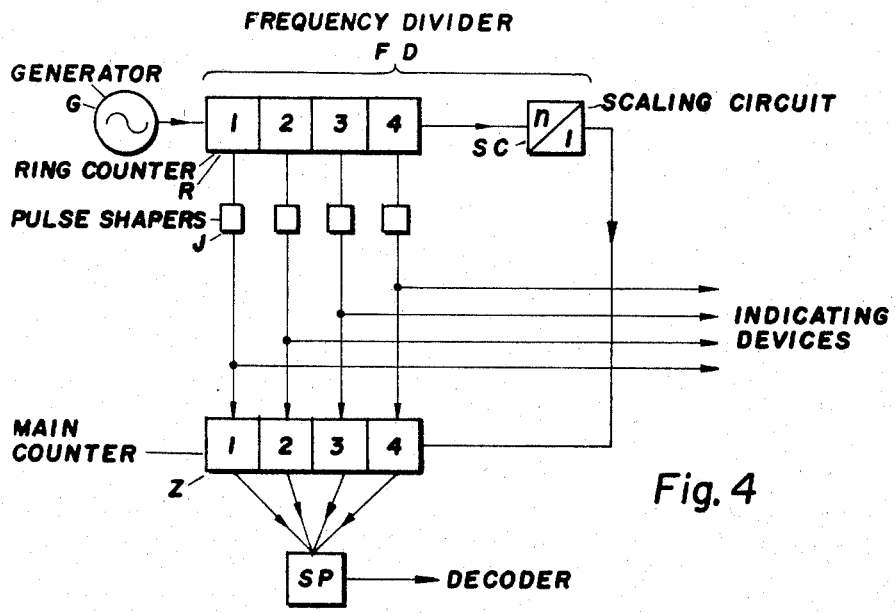
FIGURE 4 is an advantageous modification of the basic circuits (FIGURES 1 to 3) using a frequency divider as part of a counter additional for delivering interrogation pulses to the indicator means.

FIGURE 4 demonstrates by example of a digital clock how the ring counter R of FIGURES 1 to 3 may be saved under certain circumstances. The generator G, e.g. a crystal oscillator, delivers a periodic signal to the frequency divider FD which usually must be provided between signal source and main time counter Z. The frequency divider consists of a common scaling circuit SC and another part that is built up as a ring counter R with a number of places adequate to the number of digital places in the main countar Z. The output of the scaling circuit delivers clock pulses e.g. in a distance of one second to the count input of the main counter. The ring counter acts with respect to the indication of the main counter result in the same way as described under FIGURES 1 to 3.

Figure 5A:
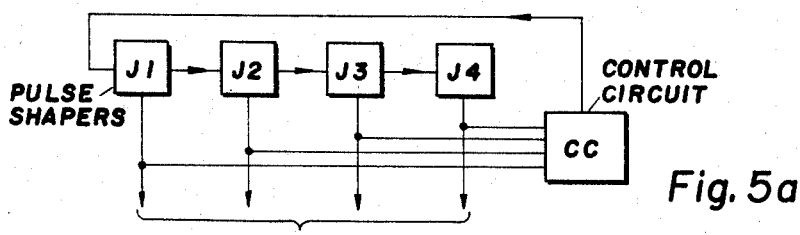
FIGURES 5 and 6 illustrate other simplifications, the ring counter of the basic circuits being replaced by series-connection of pulse shapers.
Figure 5B:
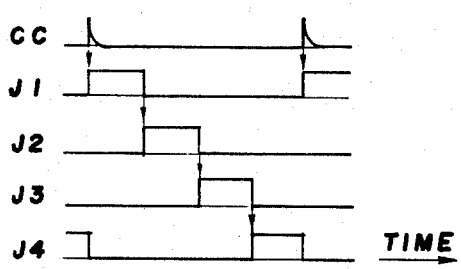

FIGURE 5a illustrates how the ring counter of FIGURE 1 can be omitted at all. The pulse shapers J1 to J4, e.g. blocking oscillators, are connected in series. The end edge of the pulse from J1 actuates J2, the end edge of the pulse from J2 actuates J3 etc., how it is shown in the pulse diagram of FIGURE 5b. In order to avoid that always two or more pulse shapers are giving a pulse at the same time, which may occur after a disturbance, a control circuit CC is inserted that only actuates J1, when all shapers have finished their pulses. The function of the pulse shapers according to the indication process has been described under FIGURE 1.

Figure 6A:
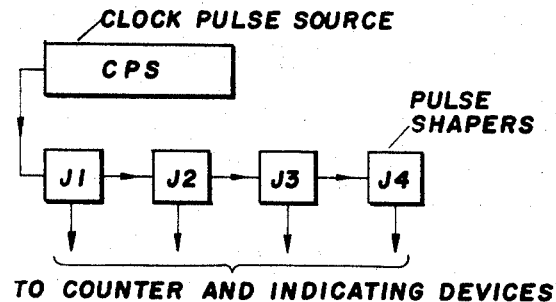
Figure 6B:
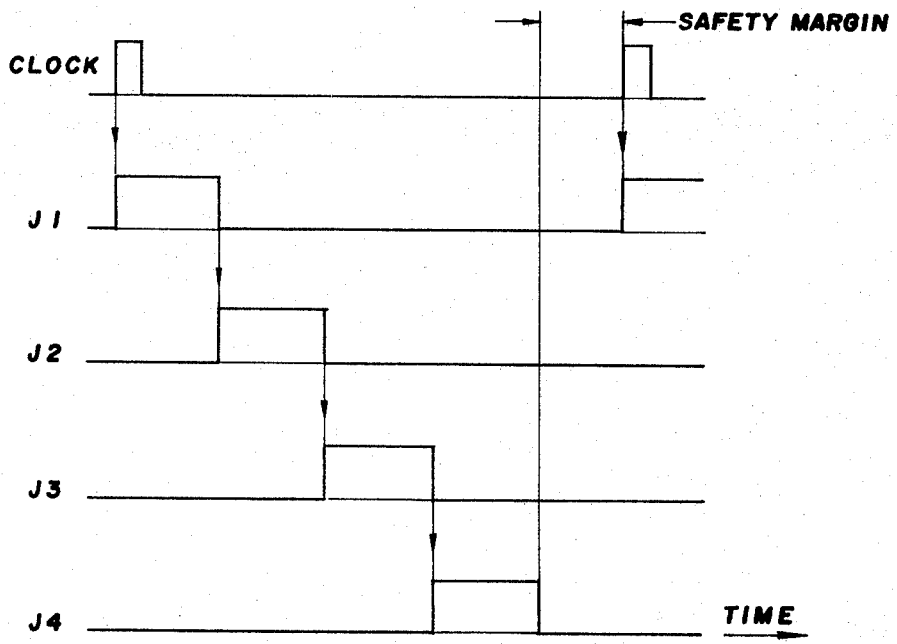

In FIGURE 6a similar to FIGURE 5a the ring counter of FIGURE 1 is omitted and the pulse shapers J1 to J4 are connected in series. An indicating cycle is initiated by a pulse from the clock pulse source CPS, which actuates pulse shaper J1. The end edge of the pulse from J1 actuates J2 etc. Between the end of the last shaper pulse and the appearance of the next clock pulse a safety margin is introduced in order to avoid interferences between shaper pulses and clock pulses, how it is shown in the pulse diagram of FIGURE 6b. In respect of the indicating process the pulse formers work as said before.

Figure 7:
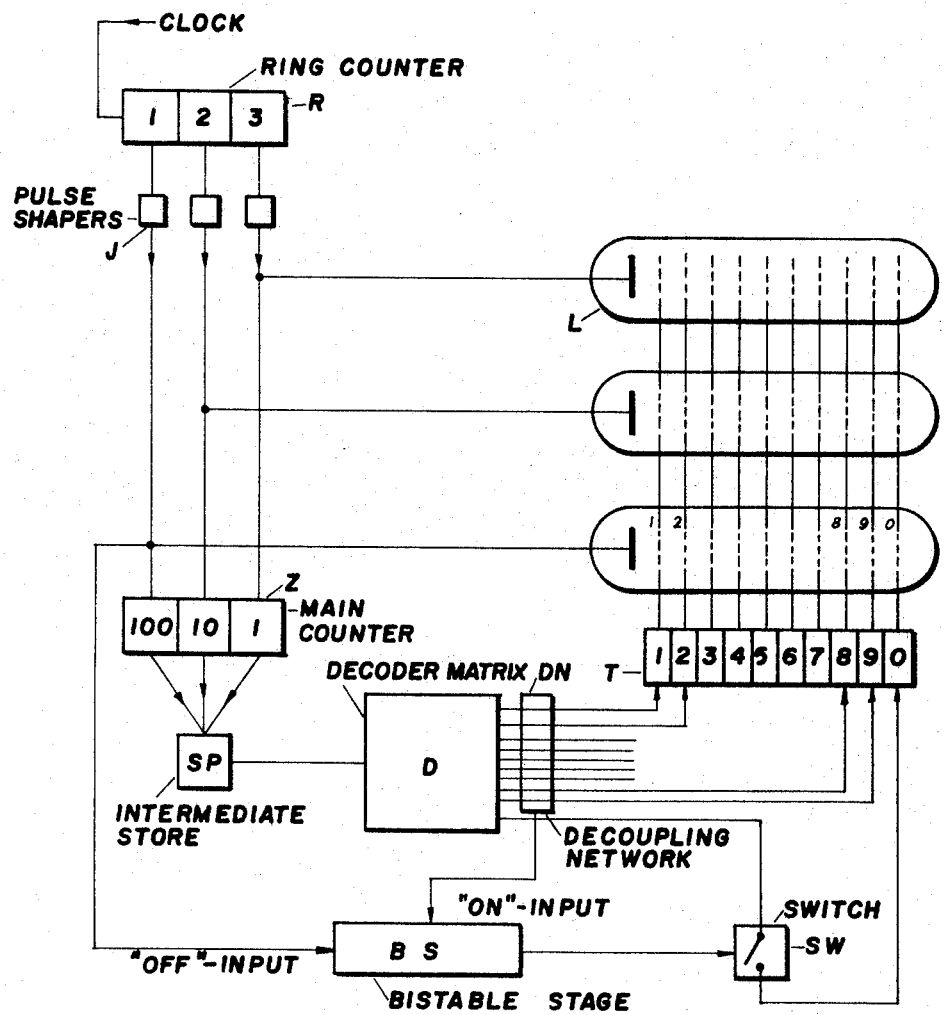
FIGURE 7 is a basic circuit according to FIGURE 1 with additional means providing a clearer result indication by eliminating nonsignificant zeros.

FIGURE 7 gives an example for avoiding nonsignificant zeros in the first digits of a result. The block diagram is somewhat differing from FIGURE 1. In addition to FIGURE 1 a bistable stage BS, a switch SW and a de-coupling network DN are introduced. The bistable stage controls the switch. When the switch and the bistable stage are in "off" position, a "zero"- information, coming from the decoder, will not be displayed. The ring counter is connected in such a way that the interrogation of the main counter is running from left to right beginning with the decade of the highest order. The front edge of the interrogation pulse of the first decade turns the bistable stage in off-position. The switch remains in that position until the first digital value different from zero will appear in the decoder. The decoupling network DN will detect this and bring the bistable stage in "on"-position. In this way, zeros following the first digit other than zero will be displayed.

It will be understood that the above description of the present invention is susceptible to various modifications, changes and adaptations, and the same are intended to be comprehended within the meaning and range of equivalents of the appended claims.

What is claimed is:

1. In an arrangement for the reading and decimal indication of a result contained in a multi-place decimal counter, wherein an indicator device including two different groups of electrodes is provided for each decimal place, which indicator devices are connected on the one hand to code-converting devices connected to the counter decimal places and on the other hand to similarly connected switching-over devices, the improvement wherein all the indicator devices are connected with one of their groups of electrodes in parallel with one another to a common decoding matrix which in turn is connected to the output side of the counting decimal places, the other group of electrodes in each indicator device is connected separately to the output of a signal source which delivers a cyclic clock pulse and which also controls the interrogation of the associated counting decimal places, and switches are inserted in the connection between the electrodes of the indicator devices and the code-converting matrix.

2. A device for the reading and decimal indication of a result contained in a multi-place decimal counter, comprising, in combination:
  (a) an indicator means for each decimal place and each including two different groups of electrodes;
  (b) a multi-place decimal counter;
  (c) decoding means connected to the output of the decimal counter and to one of the groups of electrodes of the indicator means and which electrodes are connected in parallel with one another; and
  (d) signal source means for delivering a cyclic clock pulse and controlling interrogation of the places of the associated decimal counter, the other group of electrodes being connected separately to the output of said signal source means.

3. A device as defined in claim 2 comprising switching means controlled by the decoding means and connected between a common potential and the electrodes of the indicator means; and pulse shapers controlled by the clock pulse source and connected between the electrodes of the indicator devices and common potential.

4. A device as defined in claim 2 comprising pulse shapers controlled by the decoding means and connected between the electrodes of the indicator means and a common potential; and switching means controlled by the clock pulse source and connected between the electrodes of the indicator devices and the common potential.

5. A device as defined in claim 2 comprising two groups of switching means, one of them being controlled by the decoding means and connected between the electrodes of the indicator means and one pole of an additional voltage source; the other group being controlled by the clock pulse source and connected between the electrodes of the indicator devices and the other pole of the voltage source.

6. An indicating device, comprising, in combination:
  (a) a multi-place decimal counter;
  (b) an indicator means for each decimal place of the counter and each including two different groups of electrodes;
  (c) decoding means connected to the output of the places of the counter and to one of said groups of electrodes which are connected in parallel with each other;
  (d) signal source means for delivering a cyclic clock pulse and providing interrogation of the places of the associated decimal counter, the other of said groups of electrodes of each indicator means being connected separately to the output of the clock pulse means;
  (e) switching means; and
  (f) pulse shaper means, one of said (1) switching means, and (2) pulse shaper means being connected between said one group of electrodes and the decoding means, and the other of said (1) switching means and (2) pulse shaper means being connected between said other group of electrodes and said clock pulse source.

7. A device as defined in claim 6 comprising an intermediate store disposed between the outputs of the decimal places and the input of the decoding means and which is capable of receiving the contents of one counter decade.

8. A device as defined in claim 6 wherein said clock pulse source is a ring counter in which a single information is shifted cyclically through the stages of the ring counter which correspond in number to the number of decimal places.

9. A device as defined in claim 8 wherein a part of the decimal counter is constructed in the form of a ring counter.

10. A device as defined in claim 6 wherein a counter is in conjunction with a pulse generator provided as a clock pulse source which counter is connected to a decoding device which has outputs corresponding in number to the number of decimal places and only one output delivers a signal at a time.

11. A device as defined in claim 10 wherein such decoding device is connected to the output side of part of the decimal counter to be read.

12. A device as defined in claim 6 wherein the clock pulse source is formed by connecting in the form of a ring the pulse shapers, which lie in the connection between the electrodes of the indicator means and the inputs of the decimal places.

13. A device as defined in claim 12 wherein the closing of the ring between the pulse shapers is effected through an external clock pulse source.

14. A device as defined in claim 6 comprising a gate circuit with a preceding bistable stage which is connected to the output side of the decoding means and only allows the first digital value different from zero to reach the indicating means.

References Cited
UNITED STATES PATENTS

| | | | |
|---|---|---|---|
| 2,860,832 | 11/1958 | Burns | 235—92 |
| 2,849,704 | 8/1958 | Neff | 235—92 |

MAYNARD R. WILBUR, *Primary Examiner.*

DARYL W. COOK, *Examiner.*

G. J. MAIER, *Assistant Examiner.*